United States Patent

[11] 3,604,770

[72] Inventors Henri Peltier;
 Francois Lhomme, both of Billancourt, France
[21] Appl. No. 22,891
[22] Filed Mar. 26, 1970
[45] Patented Sept. 14, 1971
[73] Assignee Regie Nationale Des Usines Renault
 Billancourt, France
[32] Priority Mar. 26, 1969
[33] France
[31] 69/08908

[54] HYDRODYNAMIC BEARINGS
 3 Claims, 3 Drawing Figs.
[52] U.S. Cl. .......................................... 308/240
[51] Int. Cl. .......................................... F16c 33/66
[50] Field of Search............................. 308/240,
 78, 100, 106, 108; 184/5

[56] References Cited
 UNITED STATES PATENTS
 2,106,860 2/1938 Tibbetts ....................... 308/240
 3,515,449 6/1970 Harbage ....................... 308/240

Primary Examiner—Martin P. Schwadron
Assistant Examiner—B. L. Grossman
Attorney—Stevens, Davis, Miller and Mosher ABSTRACT: Hydrodynamic bearing of which the internal surface provides a clearance for an oil film in relation to the shaft surface to be rotatably mounted therein, said internal surface being corrugated to create at least three oil overpressure areas for centering said shaft during its rotation, characterized in that said corrugated surface comprises, for each overpressure area, a contour of substantially sinusoidal pattern corresponding, in the direction of rotation of the shaft, to more than one half-sinusoid having a concave initial portion followed by a larger convex portion creating the hydrodynamic shaft bearing area, said convex portion being furthermore followed by another contour more concave than the preceding one, which constitutes an oil reserve, the generatrices of said contour being curved with a median convexity extending in the direction of rotation of the shaft.

HYDRODYNAMIC BEARINGS

This invention relates to hydrodynamic bearings of the type wherein the cylindrical shaft or journal revolves on an oil film comprising high oil-pressure areas ensuring the rigidity and centering of this shaft by wedging same between said high-pressure areas.

Bearings are already known of which the bore has helical grooves or various patterns of so-called "oil-grooves" formed therein for the purpose of carrying along and distributing oil throughout the bearing surface, said grooves acting as oil reserves or retainers.

Bearings are also known wherein the bore consists of a corrugated cylindrical surface having generatrices parallel to the shaft or journal axis; however, although the variations thus created in the local clearance produce oil overpressures in the areas providing a smaller clearance, thus improving the centering and the transverse rigidity of the shaft, on the other hand they cause breaks in the film of lubricating oil when said clearance is inferior to a certain limit and when the corrugations are inferior to a certain amplitude. The clearances must therefore remain relatively considerable to permit a continuous supply of oil and maintain the oil film, even if self-lubricating porous materials are used.

Other bearings are known wherein the shaft or journal revolves between inclined friction shoes pivotally mounted about pivot pins parallel to the bearing axis and also adapted to produce a local overpressure by the so-called "oil wedge" effect at the contact points of said shoes. This arrangement, outside its relatively high cost, is far from imparting a sufficient rigidity to the shaft or is attended by the same risk of breaking the oil film as in the preceding solution.

It is the essential object of the present invention to provide a hydrodynamic bearing affording a rigid wedging of its shaft or journal between its high-pressure oil film bearing areas, this bearing being adapted to be manufactured by simple machining operations, said high-pressure oil film bearing areas resulting only from the profile characteristics of the bearing which is free of any movable component element.

Basically, the hydrodynamic bearing according to this invention wherein the inner surface leaves a sufficient clearance for an oil film in relation to the shaft or journal to be fitted therein, said surface being corrugated in order to create at least three overpressure areas or portions adapted to center the shaft during its rotation, is characterized in that said corrugated surface comprises, for each overpressure area, a contour of substantially sinusoidal shape corresponding, in the direction of rotation of the shaft, to more than one half-sinusoid having a concave initial portion followed by a larger convex portion creating the hydrodynamic shaft bearing area, said convex portion being furthermore followed by another contour more concave that the preceding one, which constitutes an oil reserve, the generatrices of said contours being curved with a median convexity extending in the direction of rotation of the shaft.

The bearing according to this invention is advantageous in that in addition to a machining cost nearly equivalent to that of conventional plain bearings, it has a definitely longer useful life due to its constant rate of lubrication, with smaller operating clearances, a considerable shaft-holding stability, and an increased bearing capacity due to its wedging action between the hydrodynamic bearing areas.

Another advantageous feature characterizing this bearing is that it can be manufactured from relatively cheap and easily machined alloy, since the choice of the material is not critical from the point of view of bearing performance and efficiency. Thus, bearings according to this invention may be manufactured from bronze alloy of grade UE5A Pb 9, according to French Standard AFNOR 01–05–16, but this material is given by way of example, not of limitation.

The moderate clearances and high shaft rigidity obtained with the bearings of this invention make them ideally suited for machine tool construction in which they constitute a precision and efficiency factor as far as tool operation is concerned, due to the elimination of undesired vibration in the shafts of kinematic chains, but it will be readily understood by those conversant with the art that this specific use constitutes but an exemplary application of the bearings of this invention.

A typical form of embodiment of a bearing according to this invention will now be described by way of example with reference to the attached drawing, in which.

Figure 1:
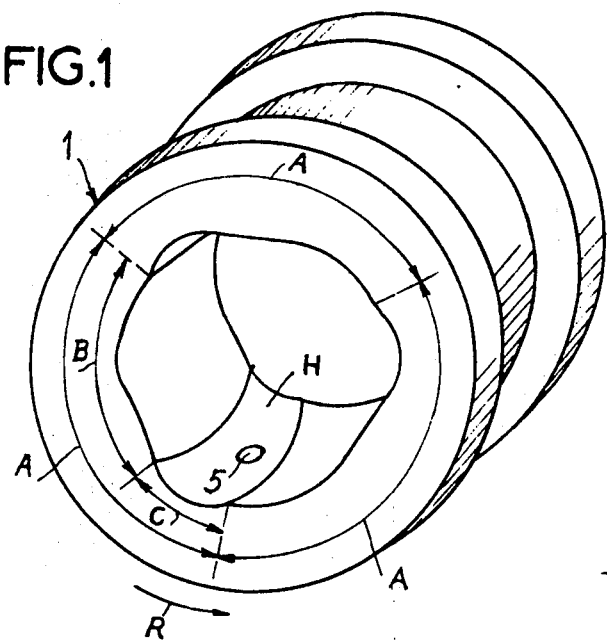
FIG. 1 is a perspective view of the bearing, the amplitude of the variations in its internal surface being somewhat magnified.
Figure 2:
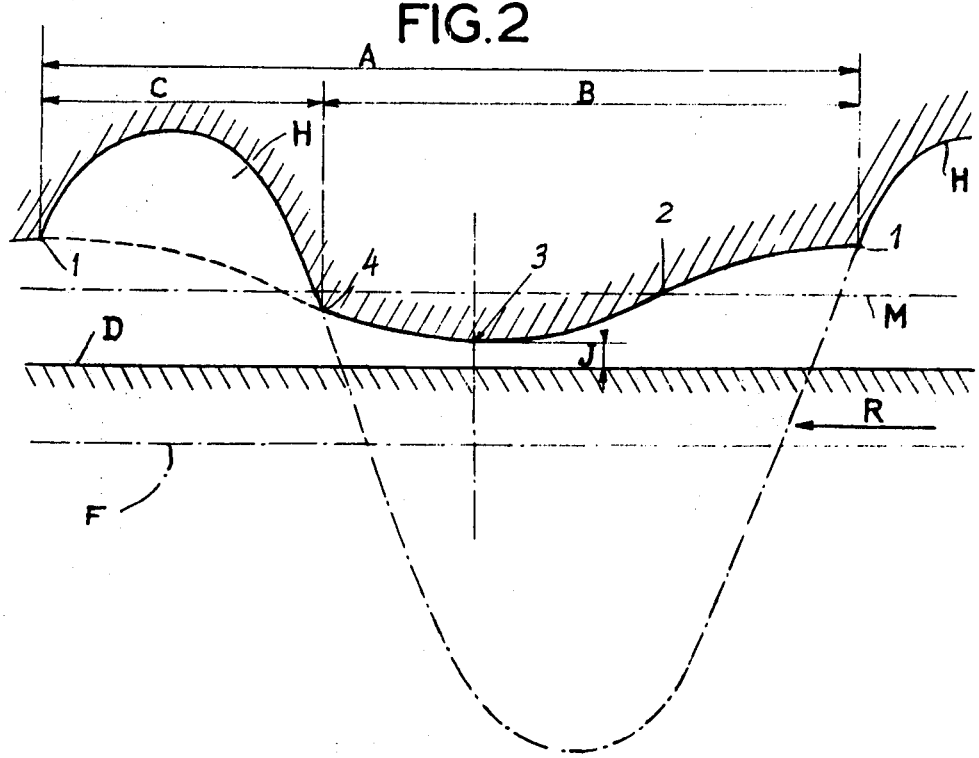
FIG. 2 is a developed side view of a sector of about 120° of this bearing, the amplitude of the surface variations being also considerably magnified in this case.

The bearing illustrated in FIG. 1 has its inner or bore surface divided into three angular areas A of same contour, which extend each along 120°, the developed view of one area A being illustrated diagrammatically in FIG. 2, wherein the straight line D corresponds to the shaft circumference, the shaft being assumed to revolve in the direction shown by the arrow R.

Each area A comprises in this case a section B of sinusoidal profile having a median line M and an extent greater than a half-sinusoid, this section B having, in the direction of rotation R of the shaft, a concave initial portion disposed between points 1 and 2, and subsequently a more extended convex portion disposed between points 2, 3 and 4, the apex 3 of this convex portion leaving a working clearance J for the shaft. This convex contour portion is followed by another section C having a contour still more concave than the preceding one, this section C constituting an oil reserve H and ending at the beginning of the next contour section B.

Figure 3:
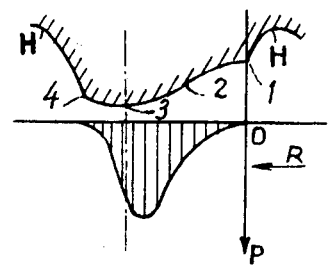
FIG. 3 is a diagram plotting, along a profile of the type illustrated in FIG. 2, the corresponding changes in the pressure P of the oil film formed between the shaft and the bearing during the operation.

During the operation, the oil contained in each cavity H is carried by throttling in the direction of rotation R of the shaft, along the concave portion 1, 2, then along the convex portion 2, 3, with point 2 constituting the point of change of the curve between the two contours, the oil pressure increasing as shown in FIG. 3, up to a point of the convex contour which lies shortly before the point 3 of maximum throttling effect, the decrease in the pressure gradient at this point, where the throttling progressiveness becomes nearly zero, causing the beginning of the sudden pressure drop occuring between points 3 and 4 constituting the expansion zone, whereby the pressure becomes nearly zero at point 4 and in the following reserve-forming cavity H. Between points 2 and 3 the oil will thus form a kind of hydrodynamic bearing shoe for the shaft. Moreover, the generatrices of contour sections B and C are curved with the median convexity extending in the direction of rotation R of the shaft, as clearly shown in FIG. 1.

This curvature of the generatrices causes the oil flow (tangential to the shaft surface) to be deflected towards the center of the bearing in order to compensate the conveying of oil towards the outer edges of the bearing as a consequence of the oil pressure, thus maintaining a constant oil film. In this respect it will be noted that oil may be fed into each reserve-forming cavity H through a hole such as 5, or multiple holes or grooves, such as ordinary oil grooves.

To prevent any oil cavitation the ratio of the amplitude of the contour section B to the working clearance J must preferably remain lower than 3.

Preferably, and in order to permit the machining of these bearings in a single operation on a special lathe adapted to generate sinusoidal profiles, the contour section C is also selected to be sinusoidal, as illustrated in FIG. 2, the corresponding sinusoid with a median line F having the same frequency as that used for generating said contour section B, but a considerably greater amplitude.

Of course, various modifications and variations may be brought to the specific form of embodiment of the present invention which is shown and described herein, without departing from the scope of the invention as set forth in the appended claims.

I claim:

1. Hydrodynamic bearing of which the internal surface provides a clearance for an oil film in relation to the shaft surface to be rotatably mounted therein, said internal surface being corrugated to create at least three oil overpressure areas for centering said shaft during its rotation, characterized in that said corrugated surface comprises, for each overpressure area, a contour of substantially sinusoidal pattern corresponding, in the direction of rotation of the shaft, to more than one half-sinusoid having a concave initial portion followed by a larger convex portion creating the hydrodynamic shaft bearing area, said convex portion being furthermore followed by another contour more concave than the preceding one, which constitutes an oil reserve, the generatrices of said contour being curved with a median convexity extending in the direction of rotation of the shaft.

2. Hydrodynamic bearing according to claim 1, characterized in that the contour portion constituting the oil reserve has an essentially concave sinusoidal profile.

3. Hydrodynamic bearing according to claim 1, characterized in that the ratio of the amplitude of the sinusoidal profile creating the hydrodynamic bearing area and the working clearance between the shaft and the apex of the convex portion of said profile is less than three.